(No Model.) 2 Sheets—Sheet 1.
H. L. DE ZENG, Jr.
REFRACTOMETER.
No. 550,747. Patented Dec. 3, 1895.
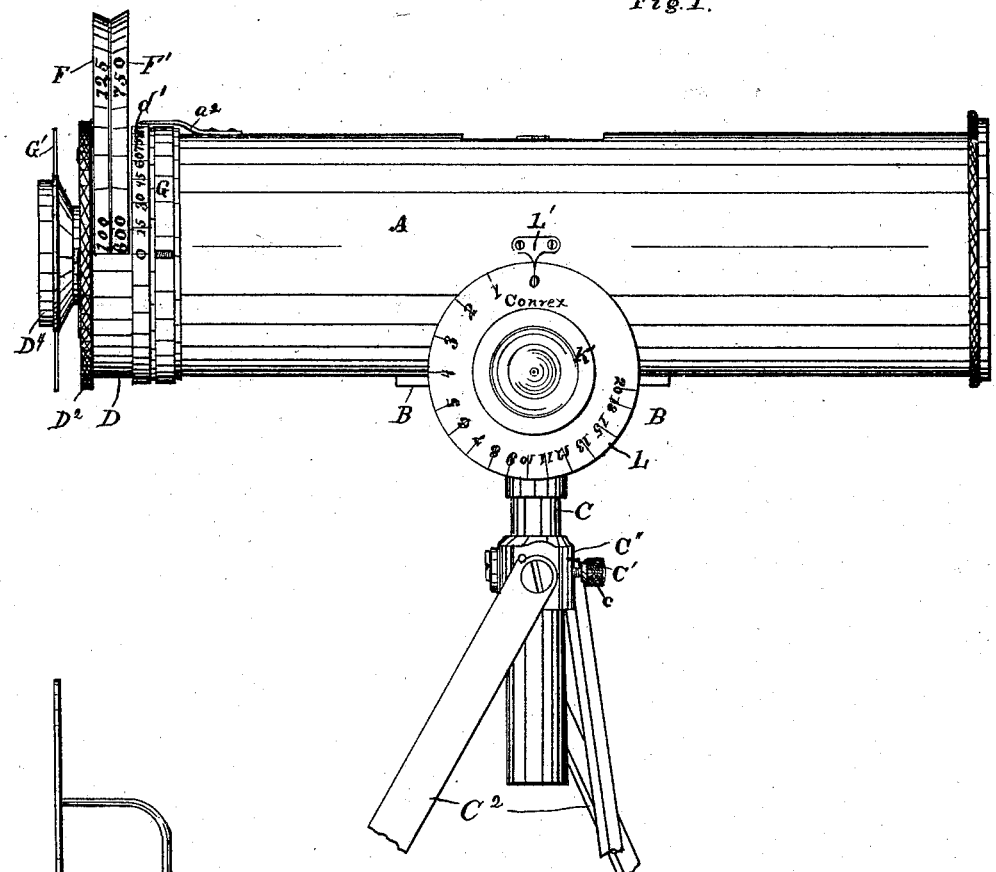
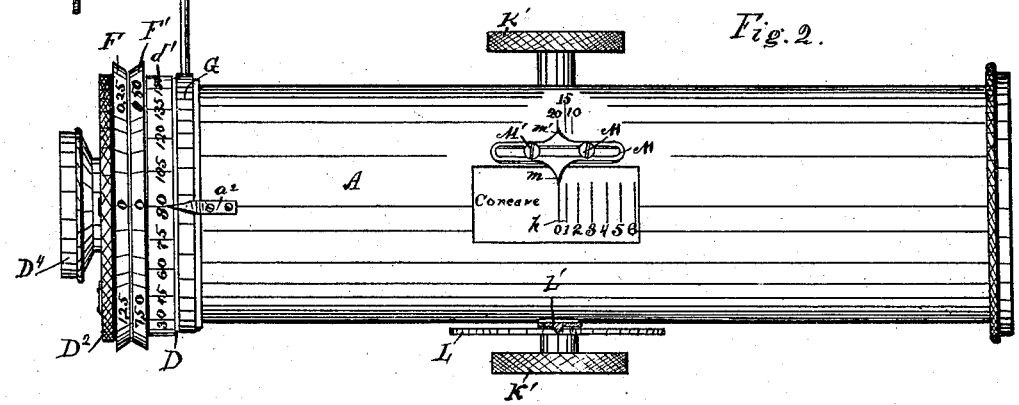

(No Model.)  H. L. DE ZENG, Jr.  2 Sheets—Sheet 2.
REFRACTOMETER.

No. 550,747.  Patented Dec. 3, 1895.

UNITED STATES PATENT OFFICE.

HENRY L. DE ZENG, JR., OF GENEVA, NEW YORK.

REFRACTOMETER.

SPECIFICATION forming part of Letters Patent No. 550,747, dated December 3, 1895.

Application filed July 13, 1895. Serial No. 555,921. (No model.)

*To all whom it may concern:*

Be it known that I, HENRY L. DE ZENG, Jr., of Geneva, in the county of Ontario and State of New York, have invented certain new and useful Improvements in Refractometers; and I do hereby declare the following to be a full, clear, and exact description of the same, reference being had to the accompanying drawings, forming a part of this specification, and to the reference-letters marked thereon.

My present invention has for its object to provide an optical instrument capable of diagnosing and measuring quickly and accurately errors in the refraction of the human eye, which can be used by an oculist, optician, or by the ordinary medical practitioner without the necessity heretofore existing of using the expensive case of test-lenses; and it consists in certain improvements and constructions of parts, all as will be hereinafter fully described, and the novel features pointed out in the claims at the end of this specification.

Figure 3:
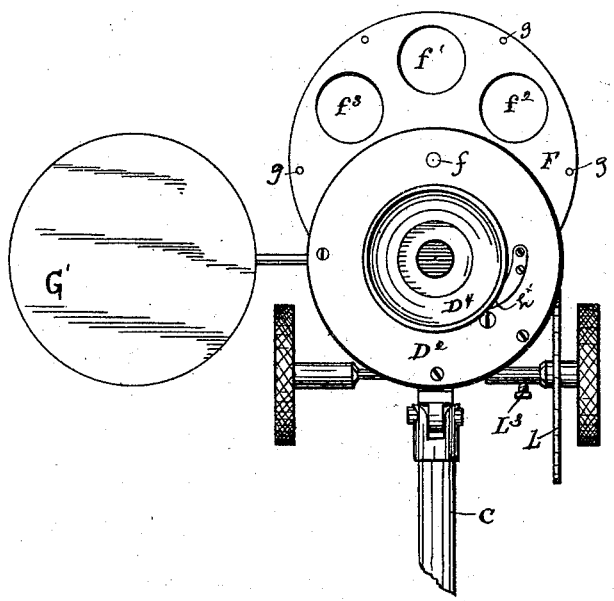
Figure 5:
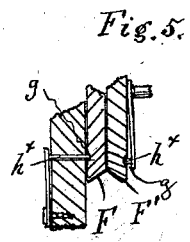
Figure 4:
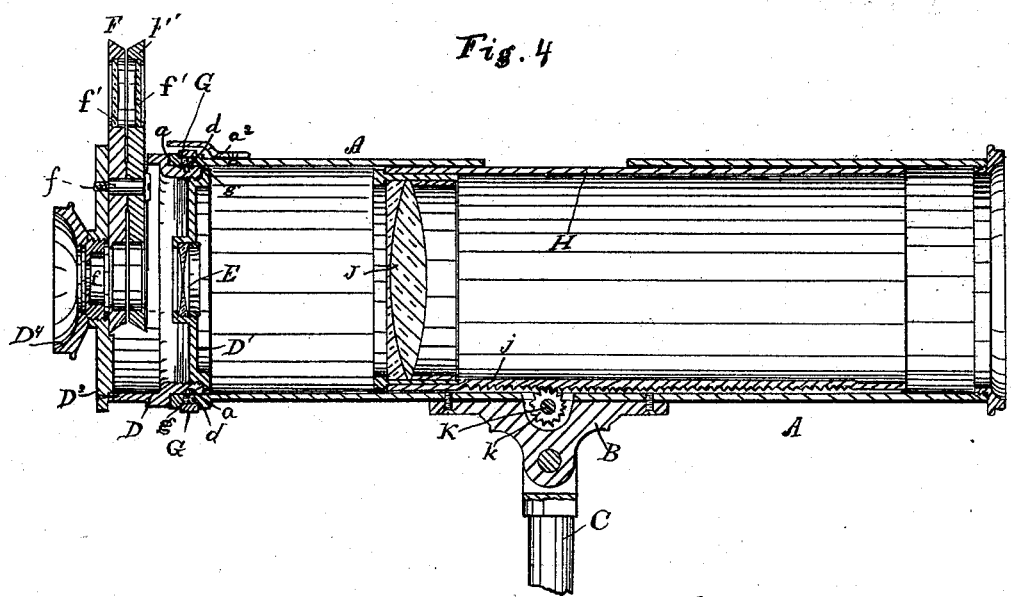

In the drawings, Figure 1 is a side elevation of an instrument constructed in accordance with my invention; Fig. 2, a plan view of the same; Fig. 3, an end view; Fig. 4, a longitudinal sectional view; Fig. 5, a detail sectional view.

Similar reference-letters in the several figures indicate similar parts.

The body or case of the instrument consists of a tubular casing A, mounted upon a bracket B, pivoted upon a rod or standard C, supported in any suitable supporting-frame, as a ring C', to which are attached legs $C^2$, forming a tripod, a securing-screw $c$ serving to hold the standard in position. The rear end of the tube A is open, and at the forward end is arranged a sleeve or eyepiece D, carrying in its inner end a diaphragm D', in which is mounted a small negative lens E, while upon the front $D^2$ of said eyepiece is arranged a small diaphragm $D^4$. The eyepiece D is not rigidly attached to the tube A; but the end of the latter is provided with an annular groove $a$, into which project two or more small screws $d$, and it is provided with a scale $d'$ on its outer periphery, marked off in degrees, with which co-operates an index $a^2$ on the upper side of the tube A, so that the eyepiece can be rotated on the tube and the amount indicated by the scale, as will be described.

Pivoted upon the pin or screw $f$ on the eyepiece are two disks or lens-carriers F F', each having a series of apertures, in which are arranged cylindrical lenses $f'$ $f^2$ $f^3$, &c., the axes of said lenses being radial to the center $f$, on which the disks F F' are adapted to be moved. These disks have their edges milled and inclined toward each other and are provided with marks on their peripheries corresponding to the lenses $f'$ $f^2 f^3$, &c., and indicating the strength of the lens exposed through aperture in eyepiece, and suitable apertures $g$ are arranged in their faces, with which co-operate suitable spring-pressed pins $h^\times$, adapted to maintain the lenses in the disks in line with the aperture in the diaphragm $D^4$. One aperture in each of the disks F F' is unprovided with a lens, and the markings on the peripheries of the disks are so arranged that when the zero-mark is in line with the index $a^2$, as in Fig. 2, the blank-apertures will be in line with the eyepiece, and the lenses in the forward disk range in strength, say, from .25 to 1.25, and those in the second disk from 1.50 to 7.50, and obviously two lenses—one in each disk—can be so combined as to provide a higher power, when desired. Any other suitable means can be provided for holding the disks in proper rotative position than the spring-operated pins shown.

G indicates a shaft-ring arranged in the annular groove $g$, formed on the tube A, carrying an eye-shade G' in the form of a blackened disk, so that the patient may keep both eyes open when using the instrument.

Sliding within the tube A is an inner tube or sleeve H, constituting a lens-carrier, having at its forward end an achromatic objective J, and the lower side of said tube is provided with a rack $j$, with which meshes a pinion $k$ on an arbor K, journaled in the bracket B, the ends of said arbor having hand-wheels K', and on one side a disk L, having a scale marked thereon, (indicated by the word "convex" on the drawings,) and with the scale co-operates an index L' on the side of the tube A.

A slot is formed in the upper side of the tube A, through which the lens-carrying tube H is visible, and upon the latter is marked a scale *h*, indicating degrees of nearsightedness or myopia. (Indicated by the word "Concave" in the drawings.)

M indicates a slotted plate fastened in position by a screw M' and having two indexes on opposite sides, one, *m*, co-operating with the scale *h* on tube H and the other, *m'*, with a scale marked on the tube A and indicating the distance for which the instrument is focused.

The relation between the eyepiece-lens and the objective is the same as that between the eyepiece and objective of an ordinary telescope or opera-glass—that is, so that the observer can see clearly the distant object, as an astigmatic chart, when properly focused.

The method of using the instrument is as follows: First set the double index M so that the index *m'* shall agree exactly with the range in which the instrument is to be used, as if the distance from the middle of the instrument to the test-types be either ten, fifteen, or twenty feet, as marked. Set the index *m'* to agree with it. Next adjust the sliding tube H by means of the hand-wheel, so that zero is indicated on the scale *h*. Then adjust the disk L (which is adjustably secured to the arbor by screw $L^3$ for this purpose) until the zero-mark on the convex scale is in juxtaposition with the index L'. The patient now applies one eye to be tested to the eyepiece (the other eye being open, but shaded by the shade G') and looks at the test letters and lines on the chart, as usual. In testing for optical errors in the refraction of the eye the instrument should first be so adjusted (by moving the hand-wheels) that the effect of a strong enough convex glass is obtained to blur to the observer all the radiating lines on the astigmatic chart used, and when the instrument is readjusted so the said blurred lines are clear the presence or absence of an optical error in the observing-eye is made manifest by the index-scales on the instrument. If the indexes point to zero, there is no defect; but if the graduations on the concave scale are beneath the index myopia is present in the eye under examination, and its degree of error is in accordance with the reading on said scale. If the graduations on the revolving or convex scale should come beneath its index when the radiating lines on the astigmatic chart are uniformly clear, hypermetropia is diagnosed, and its degree is in accordance with the reading of the convex scale.

If in using the instrument some one line or series of lines lying in a given meridian on the chart are distinctly seen and others lying at right angles from them are blurred, astigmatism exists, and its amount is equivalent to the difference in the refraction of the two chief meridians of the eye, as shown by the location of the clear and blurred lines on the astigmatic chart used.

Astigmatism is also measured, corrected, and localized by means of the concave cylindrical lenses contained in the revolving lens holders or disks F F' in the revolving eyepiece as follows: Adjust the instrument so that the effect of a strong convex lens be obtained and all the radiating lines on the astigmatic chart be blurred. Then slowly readjust until one line or series of lines lying in a given plane become clear, being careful not to go too far; revolve the eyepiece D, so that the axes of the cylinders in the disks F F' shall come parallel, when exposed, with the blurred lines lying at right angles to the clear lines on the chart, as described; revolve one or both of the disks F until a cylinder is brought into the line of vision in the instrument that renders the originally-blurred lines clear and all the lines on the chart are uniformly clear. The eyepiece D may require a partial revolution to the right or left about its horizontal axis to bring the lines uniform during the finding of the suitable cylinder by the rotation of the disks containing them, and the pointer $a^2$ will indicate on the rotating scale the angle of the astigmatism, and by the mark on the edge of the cylinder-disks that indicates the power of the cylinder exposed the exact amount of astigmatism can be measured and accurately located in both simple and compound cases.

By reason of the double index on the top of the instrument it can be readily adjusted at the factory, and the optician or user can focus it properly for his range or office.

It will be noted that the convex and concave scales are reversed and the degrees differ in length. Hence the convex scale, which requires the shorter range and the length of the degrees or units smaller, is on the rotating disk and the concave scale on the interior tube H.

The scales indicating dioptries, it is an easy matter for a physician or an optician to accurately test a patient's eyes and prescribe the proper glasses necessary to correct the refractive variations from the normal without the necessity of employing the expensive and cumbersome cases of test-lenses now generally used for the purpose.

It is within the knowledge of one skilled in the art and will be understood, therefore, that instead of moving the scales of indicating devices for adjustment the indices could be moved, and though I prefer the arrangements shown I do not desire to be confined to them.

I claim as my invention—

1. In a refractometer, the combination with the telescoping tubes and the objective and lens carried thereby and relatively adjustable, each of the tubes having a scale thereon, of the double index secured to one tube and cooperating with its scale and also cooperating with the scale on the other tube, substantially as described.

2. In a refractometer, the combination with the telescoping tubes and the objective and lens carried thereby, a scale on one of the tubes, and an index on the other, of the arbor for moving the tubes relative to each other, and an index and scale arranged between the arbor and the stationary tube, substantially as described.

3. In a refractometer, the combination with the telescoping tubes and the objective and lens carried thereby, of the rotatable sleeve, a movable lens-carrier thereon having a series of cylindrical lenses arranged to be brought one at a time in line with the objective and lens with their axes transversely thereof, substantially as described.

4. In a refractometer, the combination with the telescoping tubes and the objective and lens carried thereby, and scales and indices for indicating their relative adjustment, of the rotatable sleeve, the two lens-carriers thereon, each having a series of cylindrical lenses and movable to bring the axes of said lenses transversely of the axis of the objective, substantially as described.

5. In a refractometer, the combination with the telescoping tubes and the objective and lens carried thereby, of the reversible eye shade having at one end the disk and at the other the sleeve extending around one of the tubes and adjustable thereon independently of the lens, substantially as described.

6. In a refractometer, the combination with the telescoping tubes and the lens and objective carried thereby, of the rotatable sleeve, the two lens-carriers pivoted thereon, each having a series of cylindrical lenses and an aperture therein, and an index and scale for indicating the rotary adjustment of the sleeve, substantially as described.

7. In a refractometer, the combination with the telescoping tubes, the lenses carried thereby, and means for adjusting the tubes relative to each other, of an indicator embodying a scale and index and denoting the position of the instrument relative to a fixed object, and adjustable relative to the frame, a second indicator embodying a scale and index and denoting the relative adjustments of the lenses in one direction and cooperating with one member of the former indicator, and a third indicator embodying a scale and index and denoting the relative adjustment of the lenses in the other direction, said last-mentioned index and scale being relatively adjustable irrespective of the relation of the lenses, substantially as described.

8. In a refractometer, the combination with the stationary tube having the scale and the lens therein, of the movable tube having the scale thereon, the lens therein, the rack and pinion, the scale disk adjustably connected to the pinion and its index, and the double index cooperating with the scales on the stationary and movable tubes, substantially as described.

9. In a refractometer, the combination with the stationary and movable tubes, the lenses carried thereby, and means for adjusting the tubes relatively to each other, of the rotary sleeve having the scale and index, the lens-carrier, a series of cylindrical lenses therein, an indicator embodying a scale and index adjustable relative to the frame, a second indicator embodying a scale and index denoting the relative adjustments of the lenses in one direction, and cooperating with one member of the former indicator, and a third indicator embodying a scale and index denoting the relative adjustments of the lenses in the other direction, said last-mentioned index and scale being relatively adjustable irrespective of the relation of the lenses, substantially as described.

HENRY L. DE ZENG, JR.

Witnesses:
F. F. CHURCH,
W. L. YOUNG.